Patented Dec. 30, 1930

1,786,967

UNITED STATES PATENT OFFICE

WILLIAM J. TREVILLIAN, OF FREEPORT, ILLINOIS, ASSIGNOR TO THE W. T. RAWLEIGH COMPANY, OF FREEPORT, ILLINOIS, A CORPORATION OF ILLINOIS

PROCESS OF EXTRACTING PYRETHRUM

No Drawing.   Application filed April 14, 1929.   Serial No. 352,616.

The present invention relates to an improved process of extracting pyrethrum from pyrethrum flowers.

The primary object of the present invention resides in a practical, economical and commercially feasible process of extracting pyrethrum from its flowers whereby a substantially greater yield is obtained than has been obtained heretofore.

Still another object resides in a process of the foregoing character which leaves a dry powdered residue substantially free from odor or solvent, and adapted for a large variety of advantageous uses.

Heretofore, the most common way of extracting pyrethrum has been to percolate the ground or powdered pyrethrum flower with a suitable volatile solvent. The resulting liquid extract, comprising the solvent and the extracted drug, is used mainly in the manufacture of liquid pyrethrum insecticides. The residue remaining after the percolation, commonly known as marc, and containing a substantial amount of the solvent, has heretofore been considered as having little or no value, and hence has been discarded as a waste product.

The marc contains a substantial amount of solvent, and this solvent contains a substantial amount of the active drug in solution, the per cent of the latter being more concentrated than in the original liquid extract. I have found by analysis that the marc remaining after the first percolation contains from 25 to 40 per cent of solvent by weight. An important object of the present invention, therefore, resides in the provision of a novel process of extracting pyrethrum which comprises the step of economically extracting substantially all of the drug-laden solvent from the marc after the first percolation, or after each percolation as hereinafter provided, so as to leave a substantially dry marc residue.

I have discovered that after the first percolation, and the recovery of solvent from the resulting marc, the powdered residue still contains a substantial percentage of the active drug, and that if this residue is percolated with a solvent, and the second marc is reduced to dryness by recovering the solvent retained therein after the second percolation, a resultant liquid extract equal in strength to the first liquid extract is obtained in paying quantities. An important object of my invention therefore resides in a new and improved process of extracting pyrethrum which comprises the additional steps of percolating the first dry marc with a suitable solvent, and again recovering substantially all of the drug-laden solvent held by the second marc after the second percolation.

The complete process is substantially as follows although it is to be understood that various changes may be made without departing from the spirit and scope of the invention as expressed in the appended claims.

The comminuted or powdered pyrethrum flowers are macerated with a suitable solvent in the proper proportion. The nature of the solvent may vary with the uses for which the liquid extract is intended. If the final product is to be adapted for spraying, the solvent should be volatile. A solvent having high drug extracting properties is preferable. Kerosene, gasoline, naphtha or mixtures thereof have been found to be suitable. The maceration, which consists of steeping or soaking the powdered flowers with the solvent, serves to soften the extractible matter and hence to increase the efficiency of extraction.

The macerated mass now is percolated with the desired solvent. Perferably, this operation is carried out by causing the solvent to percolate through a column of the macerated mass. The resultant or first liquid extract comprises part of the final product of the process, and contains a normal amount of the active drug. Preferably, the amount of solvent used is such that one gallon of the liquid extract is obtained for approximately every one and one-half pounds of the pyrethrum flower. Part of the solvent is added during the maceration, and the remainder is added during the percolation. If the percolation is prolonged the resulting liquid extract will become more and more dilute.

The residue or marc, contains approximately from 25 to 40 per cent of the solvent which is laden with a substantial amount of the active drug. It also may contain from 4 to 8 per cent of water by weight. This solvent now is recovered, thereby leaving the marc in the form of a substantially dry powdered residue, i. e., substantially dry to the touch. The recovery of the solvent from the marc may be carried out in any suitable manner, but preferably is accomplished by subjecting the marc to extremely high pressures, for example up to sixteen tons per square inch, and simultaneously imparting a wringing, twisting motion to the mass. Preferably, this step is continuous, and may be accomplished by the use of a screw conveyor which has a thread starting with a large pitch at the inlet, and ending with small pitch at the outlet, and which is closely rotatable in a drum having an adjustable pressure regulating marc outlet, and pressure restraining peripheral outlets for the liquid extract. The water present in the mass facilitates the operation, and hence if the water content is low, preferably some water is added. Water, however, is extracted only with great difficulty. I have found that removal of the residual solvent in the marc by the use of pressure and a twisting movement is economical commercially, and consider its adaptation as one of the important features of the invention.

The liquid extract obtained from the marc is highly concentrated, and contains from two to three times the strength of active drug contained in the first liquid extract. This concentrate can be diluted with from one to three parts of solvent by volume, and still produce a pyrethrum insecticide that is of equal potency to the original liquid extract.

The dried marc residue still contains a substantial amount of the active drug, and hence is macerated a second time with the solvent. Thereupon the foregoing steps are repeated, the macerated mass first being percolated with the solvent, and the second marc being dried by expelling the solvent remaining therein after the percolation. In treating the dried marc preferably the volume of solvent used is such that each gallon of the liquid extract obtained from the second percolation contains the extract from five pounds of the mass. The resulting fluid extract then has substantially the same strength as the first liquid extract.

It will be evident that a very high yield of liquid extract is obtained when employing the foregoing process, and that the process is economical commercially.

The final dried residue is practically free from solvent and is almost odorless. I have discovered that this residue therefore may be advantageously adapted to numerous uses. Thus, it may be mixed with an agglutinant, and then formed into tablets of any desirable shape. By the addition of suitable odoriferous substances, for example, such as oil of pine needles, oil of cedarwood, oil of cedarleaf, or oil of lavender, to the dried marc, the latter may be used as a base for incense tablets, cones, pastilles, punk, etc. By adding certain chemicals or drugs, the products also can be used successfully for fumigating or disinfecting purposes. The product also can be utilized in the manufacture of box board and other fibrous materials.

I claim as my invention:

1. The process of obtaining pyrethrum from pyrethrum flowers by an extraction process which comprises subjecting the pyrethrum flowers to a petroleum distillate solvent to extract the active principles and drawing off the active principles and solvent and forming a marc, and thereafter expelling the residual solvent and active principles in the resultant marc by high pressure and a twisting motion.

2. The process of obtaining pyrethrum from pyrethrum flowers by an extraction process which comprises subjecting the pyrethrum flowers to a petroleum distillate solvent to extract the active principles and drawing off the active principles and solvent and forming a marc, and thereafter expelling the residual solvent and active principles in the resultant marc by high pressure and a twisting motion, subjecting the substantially dry marc residue so formed to more of the solvent and drawing off the active principles and solvent and forming a second marc, and thereafter expelling the residual solvent and active principles from the resultant second marc by high pressure and a twisting motion.

In testimony whereof, I have hereunto affixed my signature.

WILLIAM J. TREVILLIAN.